United States Patent [19]

Thompson

[11] 4,103,868
[45] Aug. 1, 1978

[54] BALL VALVE HAVING AN IMPROVED BALL ELEMENT DESIGN

[75] Inventor: William S. Thompson, Elkhart, Ind.

[73] Assignee: Elkhart Brass Manufacturing Co., Inc., Elkhart, Ind.

[21] Appl. No.: 755,269

[22] Filed: Dec. 29, 1976

[51] Int. Cl.² .............................................. F16K 5/06
[52] U.S. Cl. ..................................... 251/283; 251/315
[58] Field of Search ................................. 251/283, 315

[56] References Cited

U.S. PATENT DOCUMENTS

| | | | |
|---|---|---|---|
| 3,284,045 | 11/1966 | Kulisek | 251/315 |
| 3,475,003 | 10/1969 | Paluszek | 251/283 |
| 3,528,448 | 9/1970 | Urban | 251/315 |

*Primary Examiner*—William R. Cline
*Assistant Examiner*—H. Jay Spiegel
*Attorney, Agent, or Firm*—James D. Hall

[57] ABSTRACT

A ball valve to accommodate liquid flow having a rotatable ball element formed with a plurality of reaction faces which when contacted by liquid flow through the valve serve to generally counterbalance the normal self-closing forces exerted upon the ball element by the liquid flow.

3 Claims, 10 Drawing Figures

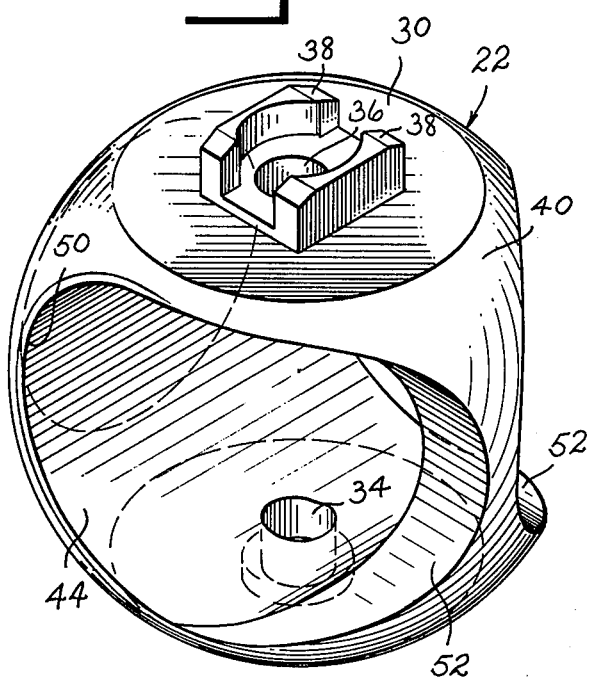
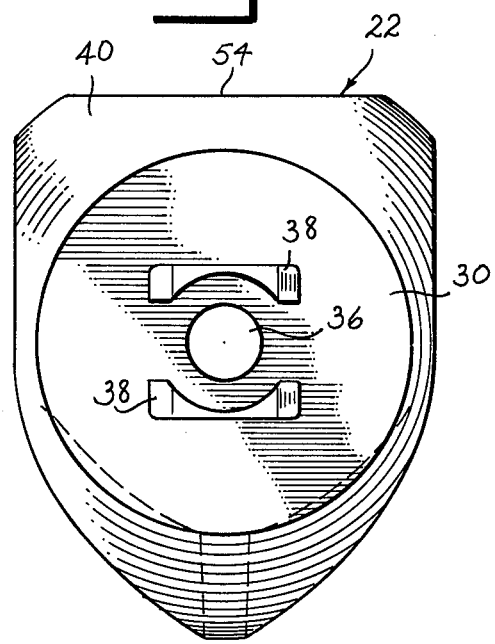
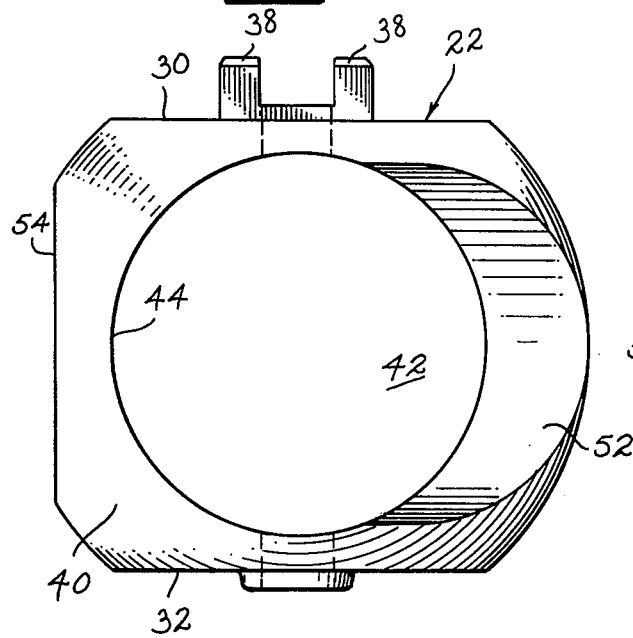
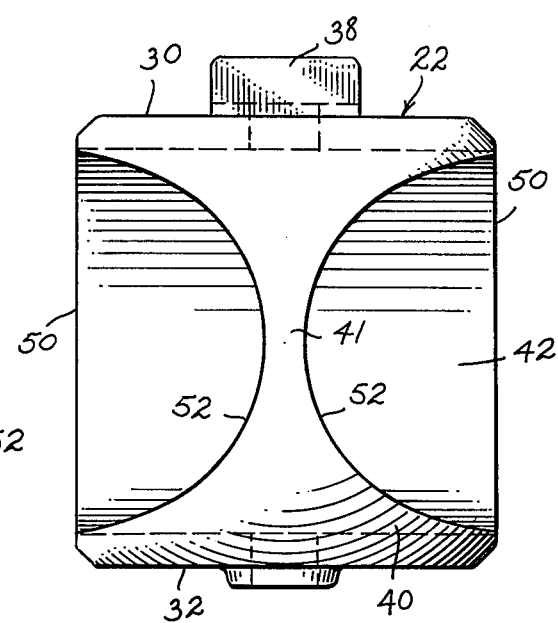

4,103,868

BALL VALVE HAVING AN IMPROVED BALL ELEMENT DESIGN

BACKGROUND OF THE INVENTION

This invention relates to a ball valve for accommodating liquid flow such as water and will have specific application to the design of the ball element within the valve.

The rotatable ball element in the ordinary ball valve is subjected to hydraulic moments created by fluid flow through the valve in such a manner that there is a tendency for the ball element to be abruptly urged into its closed position if the handle for rotating the ball element is released when the ball element is in an intermediate open position. Efforts to equalize the hydraulic moments exerted upon the rotatable valve element in related globe valves are found in German Pat. Nos. 858 178, issued Dec. 4, 1952, and 934 920, issued Nov. 10, 1955. Such efforts were principally directed to the relief of vacuum pockets formed about the rotative valve element with the valve element being constructed to rotate in one direction.

In the following described invention the ball element of the ball valve is designed with a plurality of reaction faces by which the hydraulically created moments exerted upon the ball element during liquid flow through the valve are substantially neutralized.

SUMMARY OF THE INVENTION

In the ball valve of this invention the rotative, generally spherical ball element is designed with two beveled reaction faces which make production contact with the liquid flow regardless of the direction of rotation of the element to generally counterbalance the normal hydraulically induced moments imposed upon the ball element. Additionally, the spherical outer surface of the ball element is interrupted by a flattened end wall which allows a greater amount of liquid to flow around the ball element when in a partly open position to further reduce the normal hydraulic moments upon the ball element.

It is an object of this invention to provide a ball valve having a general hydraulically balanced ball element.

Another object of this invention is to provide a ball valve having a ball element with a plurality of beveled reaction faces which when the ball element is rotated into a partly open position serve at least in part to balance the hydraulic moments normally imposed upon the ball element by liquid flow through the valve.

Still another object of this invention is to provide a ball valve which is used with firefighting apparatus and which has a ball element which can be opened by a minimum of force.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 7 is a perspective view of the ball element shown separated from the valve housing.

FIG. 8 is a top view of the ball element.

FIG. 9 is an end view of the ball element.

FIG. 10 is a side view of the ball element.

DESCRIPTION OF THE PREFERRED EMBODIMENT

Figure 1:
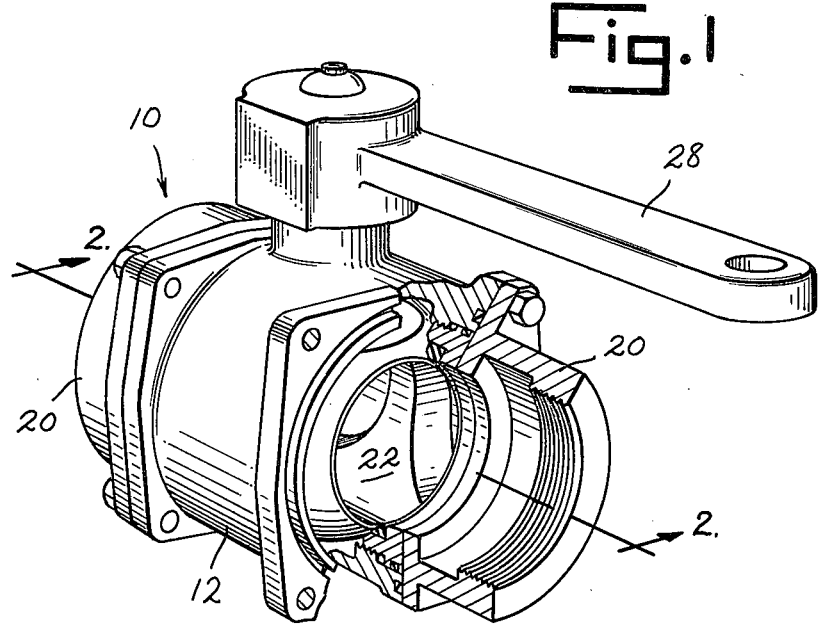
FIG. 1 is a perspective view of the ball valve having the ball element thereof in its open position and with a portion of the valve housing broken away for purposes of illustration.
Figure 2:
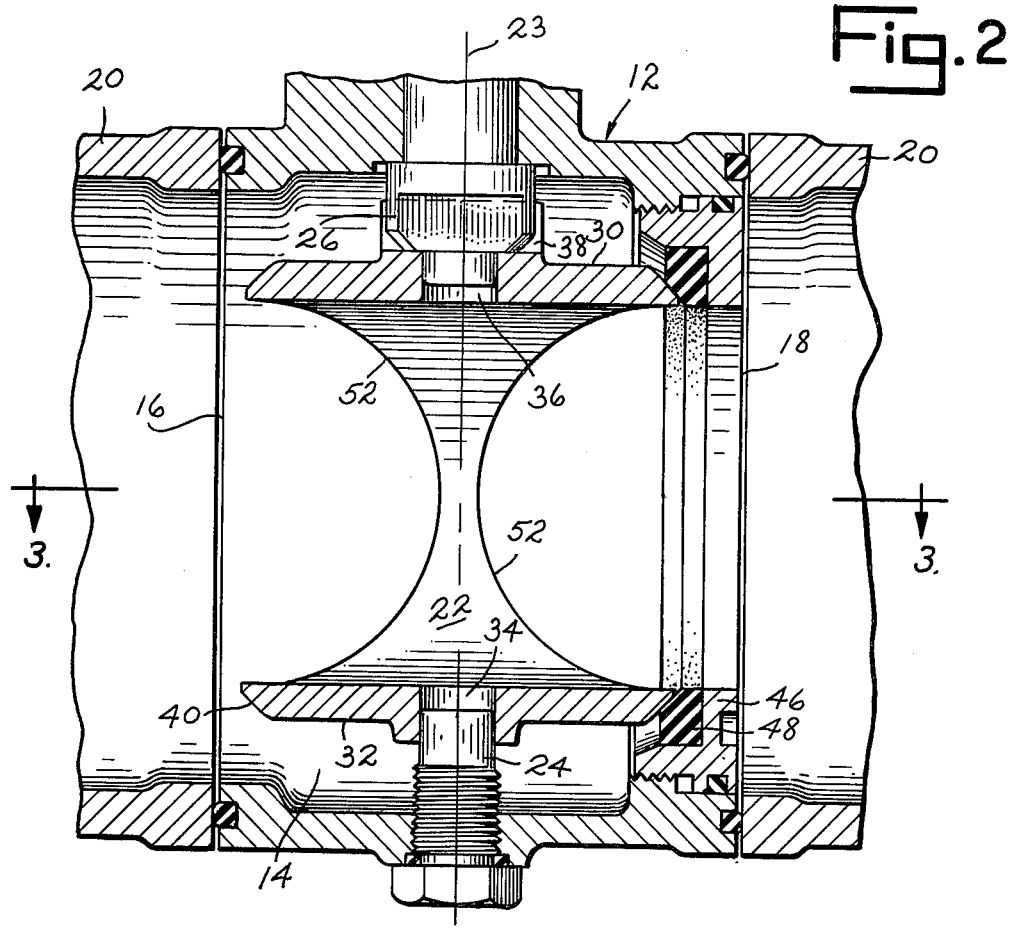
FIG. 2 is a fragmentary sectional view of the valve taken along line 2—2 of FIG. 1.
Figure 3:
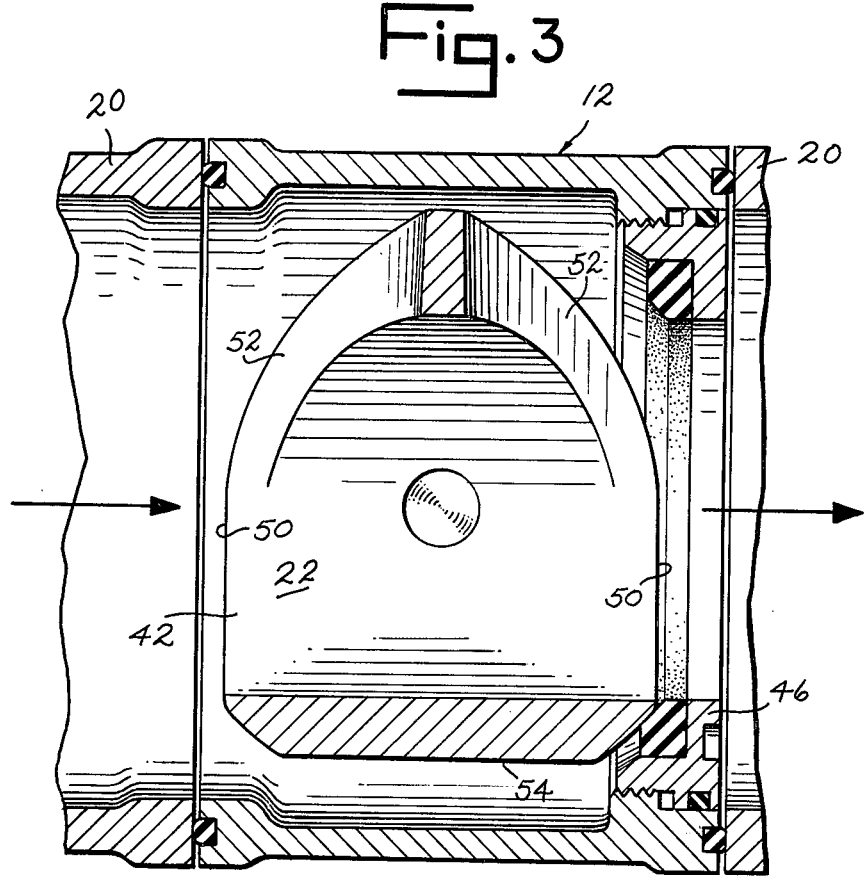
FIG. 3 is a sectional view taken along line 3—3 of FIG. 2.

The preferred embodiment illustrated is not intended to be exhaustive or to limit the invention to the precise form disclosed. It is chosen and described in order to best explain the invention and its application and practical use to thereby enable others skilled in the art to best utilize the invention.

Ball valve 10 includes a housing 12 having a chamber 14 therein. Housing 12 includes an inlet 16 and an outlet 18. A threaded coupler 20 is secured to housing 12 at each of its inlet 16 and outlet 18. Couplers 20 allow valve 10 to be connected between liquid conduits, such as piping, tubing or hose.

A ball element 22 is carried within chamber 14 of housing 12 between its inlet 16 and outlet 18 and is rotatably supported between a pivot bolt 24 and the stem 26 of a handle 28. As is common in the art, ball element 22 is provided with end faces 30 and 32. Pivot bolt 24 projects into an opening 34 formed in end face 32 and stem 26 projects into an opening 36 formed in end face 30 of the ball element. End face 30 also carries a pair of spaced parallel flanges 38 which straddle opening 36. Handle stem 26 fits complementally between flanges 38 of ball element 22 to make fixed contact with the ball element. Rotation of handle 28 causes rotation of ball element 22 about an axis of rotation 23 within housing chamber 14.

Ball element 22 includes a spherical outer surface 40 which extends between end faces 30 and 32 and which is equal radially located from axis of rotation 23 of the ball element. Ball element 22 includes a passage 42 which extends through the ball and which is defined by a cylindrical inner surface 44. Passage 42 is transversely oriented relative to axis of rotation 23 of the ball element and is positioned so as to be alignable with inlet 16 and outlet 18 of valve housing 12. Outlet 18 of housing 12 is provided with an adjustable valve seat 46. Valve seat 46 includes a rubber or similar type elastic seal ring 48 which contacts spherical outer surface 40 of ball element 22. As thus far described, ball valve 10 is of a standard, commercially available construction.

Passage 42 through ball element 22 is defined by edge portions 50 at outer surface 40 of the ball element. Each edge portion 50 of the ball element is interrupted by a beveled arcuate reaction face 52 which extends from adjacent one end face 30 to adjacent the other end face 32 of the ball element. Reaction faces 52 are located laterally of ball element axis of rotation 23 with the spacing between faces 52 along spherical outer surface 40 of the ball element being at a maximum near end faces 30 and 32 and at a minimum substantially midway between the end faces. Reaction faces 52 are preferably of like dimension and are symmetrically located relative to a plane passing through the axis of rotation 23 and midway of that place 41 of minimum spacing between the faces at spherical outer surface 40 of the ball element.

A flat end wall 54 is formed in spherical surface 40 of ball element 22. End wall 54 parallels axis of rotation 23 of the ball element and is oppositely located from reaction faces 52. Ball element end wall 54 and reaction faces 52 cooperate to balance the hydraulic moments exerted upon the ball element about its axis of rotation 23.

Figure 4:
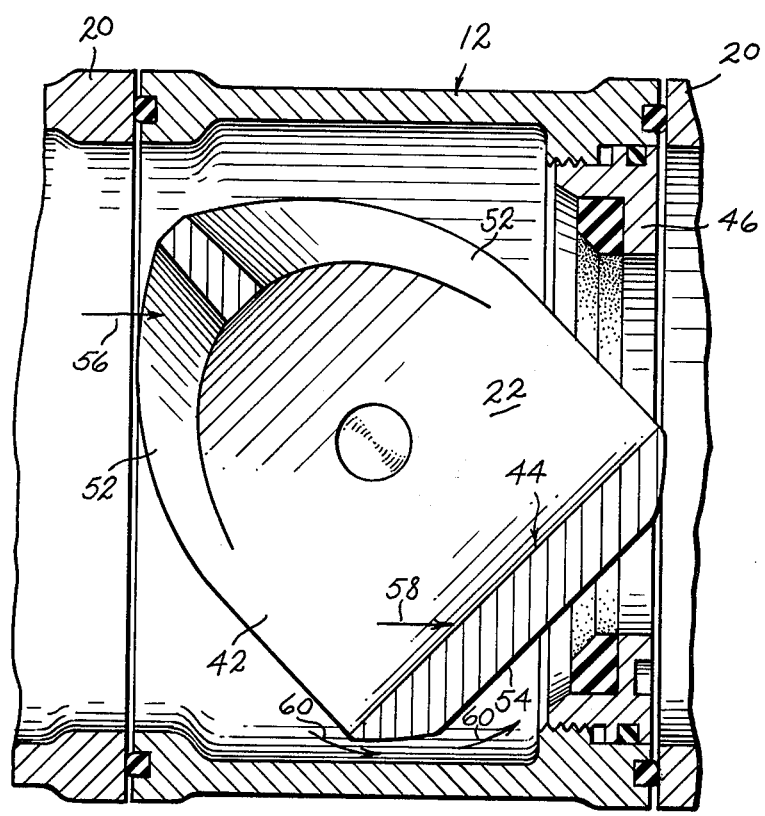
FIG. 4 is a sectional view of the valve like FIG. 3 but showing the ball element in a partially open position.
Figure 5:
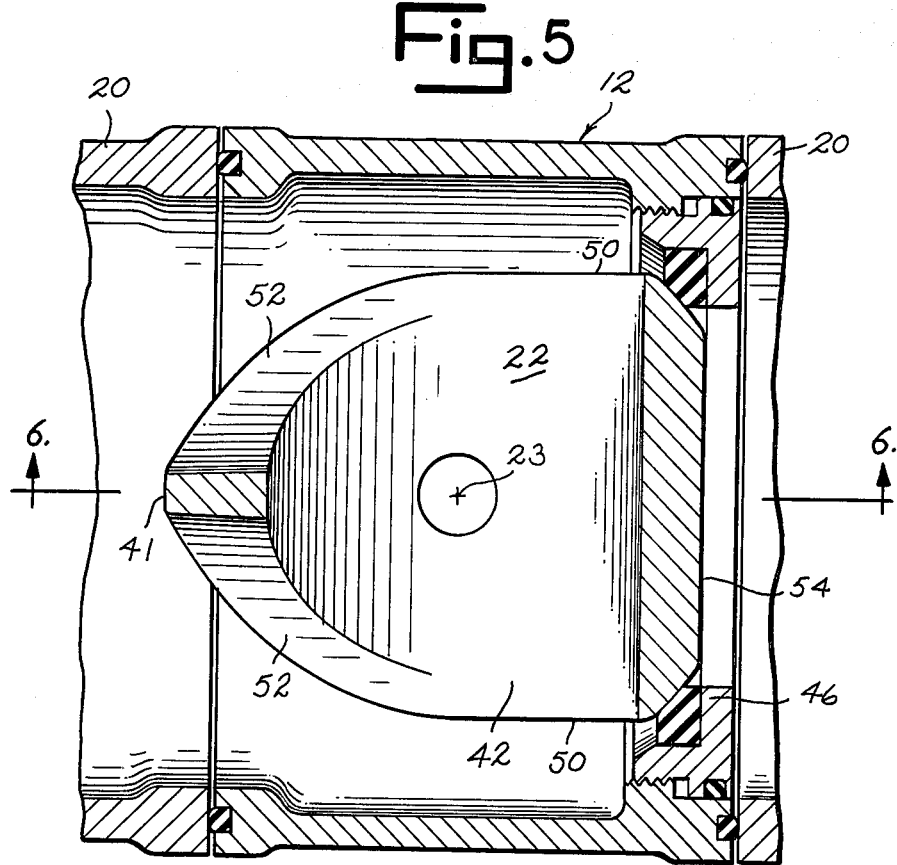
FIG. 5 is a sectional view like FIG. 3 but showing the ball element in its closed position.
Figure 6:
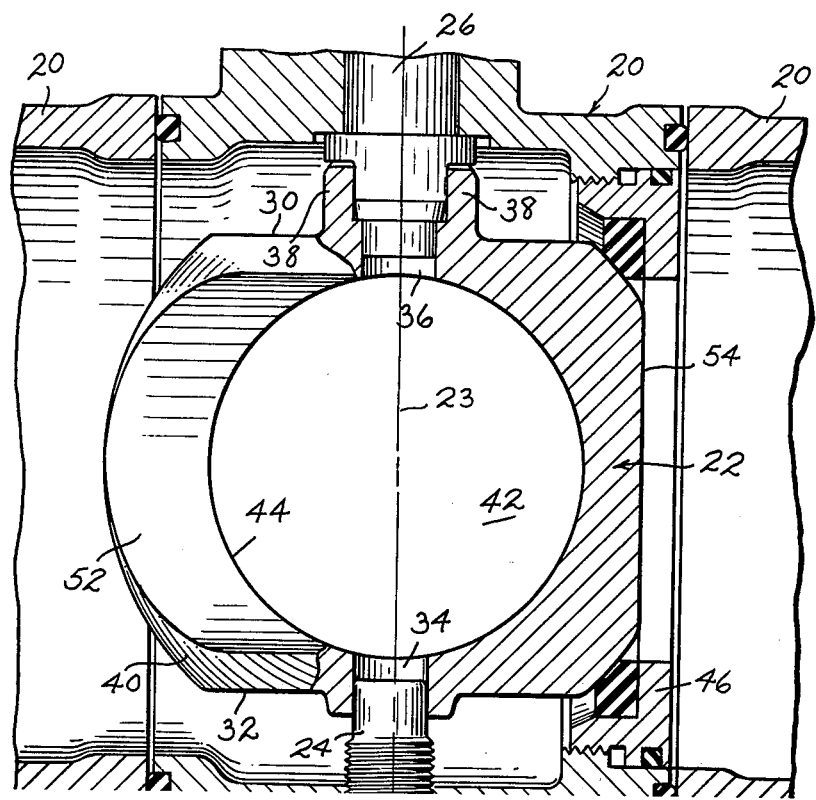
FIG. 6 is a sectional view taken along line 6—6 of FIG. 5.

As ball element 22 is rotated by handle 28 from its closed position shown in FIG. 5 to the partly open position shown in FIG. 4, liquid flow through the valve strikes a reaction face 52, as illustrated by arrow 56, to counterbalance the hydraulic moment created by liquid flow contacting inner surface 44 of passage 42, as indicated by arrow 58 in FIG. 4. Additionally, fluid flow will pass between end wall 54 of the ball element and the interior of housing 12, as indicated by arrows 60, as the ball element is rotated into an open position to further reduce the hydraulic moments exerted upon the ball element. By providing ball element 22 with a pair of adjacent reaction faces 52, the ball element may be rotated both clockwise and counterclockwise from closed to open positions with the hydraulic moments created by fluid flow through the ball element being at least in part counterbalanced by one of the reaction faces.

It is to be understood that the invention is not to be limited to the details above given but may be modified within the scope of the appended claims.

What I claim is:

1. A ball valve to accommodate liquid flow comprising a housing having a chamber therein, said housing including an inlet into said chamber and an outlet from said chamber, a ball element in said chamber positioned between said inlet and outlet, handle means located exteriorly of said housing and contacting said ball element for rotating the ball element upon an axis between closed and full open positions, one of said inlet and outlet defining a valve seat, said ball element having a circumferentially located generally spherical outer surface extending radially about said axis of rotation, said ball element having a liquid flow passage therethrough formed by a continuous side wall, said ball element flow passage intersecting said axis of rotation and interrupting said outer surface of the ball element at spaced locations to define first and second opening edge portions into the ball element, said ball element flow passage being aligned with said inlet and outlet when said ball element is in its full open position to permit liquid flow from said inlet and through said outlet, each of said opening edge portions having a beveled reaction face means constituting an arcuate surface located laterally of said axis of rotation for making contact with liquid flow when said ball element is rotated between its closed and full open positions, said reaction face means of both opening edge portions converging toward each other from said opening edge portions and terminating at said ball element outer surface, said reaction face means of both opening edge portions interrupting said flow passage side wall at spaced locations, said ball element including spaced ends intersecting said axis of rotation, said ball element outer surface located between said ends, each reaction face means extending from adjacent one end to the other end of said ball element with the spacing between the reaction face means of both opening edge portions and said ball outer surface varying from a maximum adjacent each ball element end to a minimum at a location between said ball element ends.

2. The ball valve of claim 1 wherein said ball element outer surface oppositely located from said location of minimum spacing between said arcuate surfaces constitutes means for sealingly contacting said valve seat when said ball element is in its closed position.

3. The ball valve of claim 2 wherein said oppositely located ball element outer surface is interrupted by a planar end wall paralleling said axis of rotation, said end wall being spaced from said housing at all intermediate positions of said ball element between its closed and full open positions and defining thereat in conjunction with said housing a passage means for liquid flow around said ball element between said inlet and outlet of the housing.

* * * * *